(12) United States Patent
Russ et al.

(10) Patent No.: US 11,468,734 B1
(45) Date of Patent: Oct. 11, 2022

(54) SYSTEM AND METHODS OF RECOMMENDATION MEMBERSHIPS IN A CASINO ENVIRONMENT

(71) Applicant: IGT, Las Vegas, NV (US)

(72) Inventors: Michael Russ, Graz (AT); Elisabeth Kiss, Unterpremstätten (AT); Susanne Kiss, Oberwart (AT); Julia-Ines Lerchbaumer, Spielfeld (AT)

(73) Assignee: IGT, Las Vegas, NV (US)

( * ) Notice: Subject to any disclaimer, the term of this patent is extended or adjusted under 35 U.S.C. 154(b) by 14 days.

(21) Appl. No.: 17/212,174

(22) Filed: Mar. 25, 2021

(51) Int. Cl.
*G07F 17/32* (2006.01)
*A63F 13/30* (2014.01)
*A63F 13/35* (2014.01)
*A63F 13/85* (2014.01)

(52) U.S. Cl.
CPC .......... *G07F 17/3225* (2013.01); *A63F 13/30* (2014.09); *A63F 13/35* (2014.09); *A63F 13/85* (2014.09); *G07F 17/3218* (2013.01); *G07F 17/3223* (2013.01); *G07F 17/3227* (2013.01); *G07F 17/3237* (2013.01); *G07F 17/3267* (2013.01); *G07F 17/3272* (2013.01)

(58) Field of Classification Search
None
See application file for complete search history.

(56) References Cited

U.S. PATENT DOCUMENTS

| | | | |
|---|---|---|---|
| 8,087,996 B2 | 1/2012 | Walker et al. | |
| 8,147,334 B2 | 4/2012 | Gatto et al. | |
| 8,764,566 B2 | 7/2014 | Miltenberger et al. | |
| 2014/0141864 A1* | 5/2014 | Ward | G07F 17/34 463/25 |
| 2015/0099576 A1 | 4/2015 | Anderson et al. | |
| 2015/0367238 A1* | 12/2015 | Perrin | A63F 13/355 463/29 |
| 2017/0087475 A1* | 3/2017 | Perry | A63F 13/25 |
| 2019/0275424 A1* | 9/2019 | Lee | A63F 13/86 |

FOREIGN PATENT DOCUMENTS

| | | |
|---|---|---|
| EP | 2958069 | 12/2015 |
| WO | WO 2005/034053 | 4/2005 |

* cited by examiner

*Primary Examiner* — Jason T Yen
(74) *Attorney, Agent, or Firm* — Sheridan Ross P.C.

(57) ABSTRACT

The present disclosure relates generally to gaming systems, computational devices, and methods. An illustrative method includes receiving a code request message from a computational device, where the code request message includes information describing a code requestor and a code parameter defined by the code requestor. The method may further include determining that the requestor is permitted to receive the shareable code with the code parameter defined by the code requestor, generating the shareable code, storing an electronic record indicating that the shareable code has been generated, where the electronic record includes an identifier of the shareable code and an identifier of the code requestor, and transmitting a code delivery message to the computational device, where the code delivery message includes the shareable code.

20 Claims, 11 Drawing Sheets

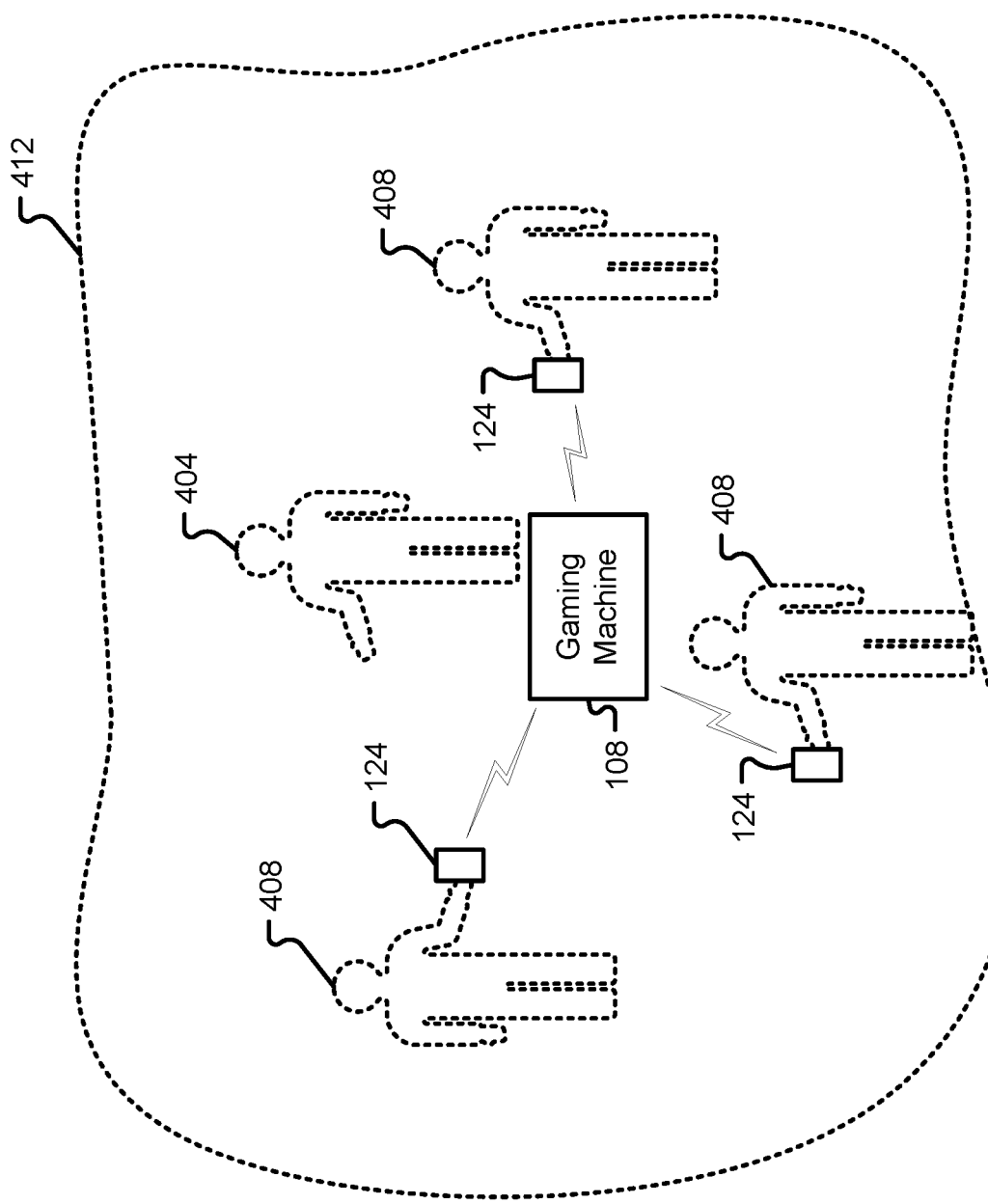

SYSTEM AND METHODS OF RECOMMENDATION MEMBERSHIPS IN A CASINO ENVIRONMENT

BACKGROUND

The present disclosure is generally directed to gaming environments and, in particular, toward structuring interactions in a gaming environment.

Many casino patrons enjoy the social aspects associated with gaming in a casino. Part of the allure for many patrons is to have a shared experience with other people they knew prior to entering the casino or that they met while playing at the casino. Limited access in casinos, either due to capacity limits or due to lack of machine availability, may frustrate the casino experience for some patrons.

BRIEF SUMMARY

In certain embodiments, the present disclosure relates to a system, computational device, and method. In some embodiments, a system is provided, comprising: a processor; and a computer memory device coupled with the processor and including instructions stored thereon that, when executed by the processor, enable the processor to: receive a code request message from a computational device, where the code request message includes information describing a code requestor and a code parameter defined by the code requestor; analyze the information describing the code requestor to determine that the code requestor is permitted to receive a shareable code; determine that the requestor is permitted to receive the shareable code with the code parameter defined by the code requestor; generate, in response to determining that the code requestor is permitted to receive the shareable code with the code parameter defined by the code requestor, the shareable code; store an electronic record indicating that the shareable code has been generated, wherein the electronic record comprises an identifier of the shareable code and an identifier of the code requestor; and transmit a code delivery message to the computational device, wherein the code delivery message comprises the shareable code.

In some embodiments, a computational device is provided, comprising: a networking interface; a processor coupled with the networking interface; and a computer memory device coupled with the processor and including instructions stored thereon that are executable by the processor, where the instructions include instructions that: receive a shareable code, where the shareable code includes a code parameter that defines a game to be played; generate a code usage message, where the code usage message includes an identifier of the shareable code; transmit, via the networking interface, the code usage message to an authentication server; receive, via the networking interface in response to transmitting the code usage message, a game initiation message, wherein the game initiation message includes an identifier of the game and instructions that initiate the game; and automatically initiate the game based on receiving the game initiation message including the identifier of the game and the instructions that initiate the game.

In some embodiments, a method is provided, comprising: receiving, at a processor, a code request message from a computational device, where the code request message includes information describing a code requestor and a code parameter defined by the code requestor; analyzing, at the processor, the information describing the code requestor to determine that the code requestor is permitted to receive a shareable code; determining, at the processor, that the requestor is permitted to receive the shareable code with the code parameter defined by the code requestor; generating, at the processor and in response to determining that the code requestor is permitted to receive the shareable code with the code parameter defined by the code requestor, the shareable code; storing, in a computer memory device, an electronic record indicating that the shareable code has been generated, where the electronic record includes an identifier of the shareable code and an identifier of the code requestor; and transmitting a code delivery message to the computational device, where the code delivery message includes the shareable code.

Additional features and advantages are described herein and will be apparent from the following Description and the figures.

BRIEF DESCRIPTION OF THE SEVERAL VIEWS OF THE DRAWINGS

FIG. 4C is a block diagram illustrating a third player pool in accordance with embodiments of the present disclosure;

DETAILED DESCRIPTION

Figure 1:
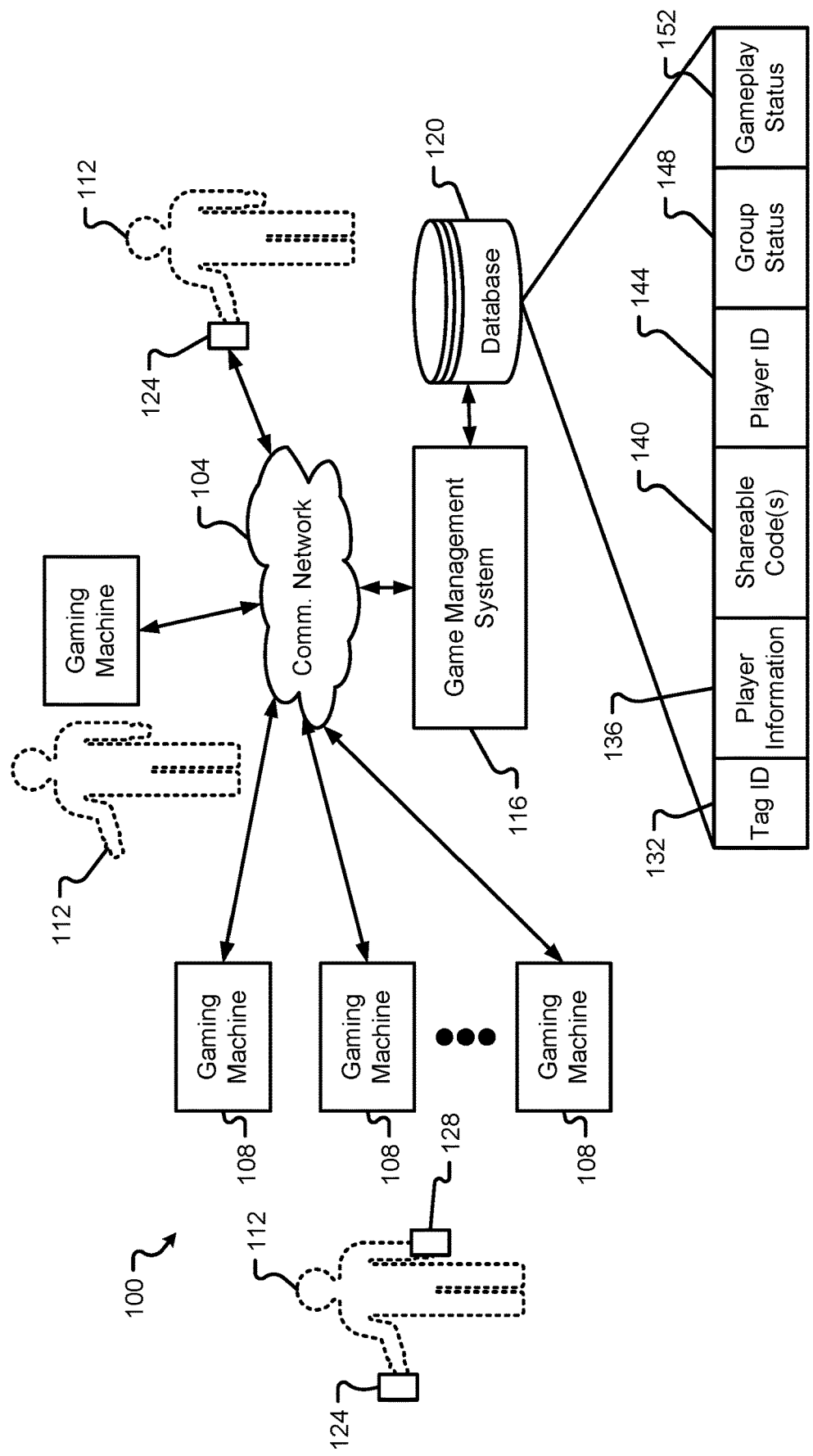
FIG. 1 is a block diagram of a system accordance with embodiments of the present disclosure.

Embodiments of the present disclosure will be described in connection with computational devices, which may be in the form of Electronic Gaming Machines (EGMs), personal computing devices, and/or mobile devices. Some or all of these devices may be configured to interact with one another in a way that facilitates enhanced group interactions between players. As will be described herein, a shareable code may provide a conduit to facilitate device interactions and to coordinate an improved user experience across a large number of devices.

Embodiments of the present disclosure recognize the desirability to enable players to establish, in an ad-hoc fashion, player pools or groups across one or many devices, particularly for the purposes of sharing experiences. This is especially useful in a casino environment where access to the casino or to machines in the casino are limited.

Embodiments described herein provide a solution that enables a player (e.g., an originating player, a code requestor, etc.) to initiate the generation of a code for sharing among a number of other players (e.g., code consumers). Illustratively, the code generation may be predicated upon the originating player or code request purchasing a subscription, applying for a rewards membership, or otherwise enrolling in a defined system. The feature of enabling code generation may be used to incentivize players to purchase application subscriptions or memberships and may also encourage gameplay (by both the originating player and players with whom the code is shared). The code, when generated, may initially bestow certain benefits to the originating player or code requestor and may further generate additional benefits for the originating player as the code is shared and used by other players. The act of code sharing and code use may be treated separately for purposes of awarding additional benefits to the originating player. For instance, a predetermined number of code shares may provide the originating player with some benefit or reward, regardless of whether or not the shared code is used for gameplay. If the shared code is later used for gameplay, then additional or alternative benefits/rewards may be provided to the originating player.

A player may be allowed to purchase a subscription or membership (which may or may not require a loyalty account) for purposes of generating a code that can be shared with multiple other people. By purchasing the membership, the player can share their code with friends, colleagues, etc. The code may be in a number of different forms. Illustratively and without limitation, the code may be provided as a string, number, picture, encoded image, barcode, QR code, alphanumeric string, string of bits, etc. The code may be universally unique, unique to the originating player or code generator, unique to a combination of the originating player and a game, unique to a game, unique to a game promotion, etc. In some embodiments, the code may generate randomly (e.g., using input from a Random Number Generator (RNG)), pseudo randomly, or deterministically (e.g., based on combining known values such as a player identification number, game identification number, device identification number, etc.).

The code may be shared by texting the code to other persons or by utilizing a share function within a mobile device application. The code itself may be used by all players (including the originating player and the players that received the code from the originating player) to play a particular game, which may or may not be the subject of a particular promotion. As each player plays a game using the code, player progress and achievements are logged within the system. The originating player may be informed of the progress of participating players and may further by awarded benefits or rewards (e.g., free spins, bonus spins, additional play credits, improved odds for a sports wager, etc.) based on other players utilizing the shared code. Thus, if multiple other people use the shared code, then the originating player gets a benefit or reward. It may also be possible to enable further sharing of the code. Referrals of the code to additional players may result in benefits for the originating player as well as the referring player. In this way, a shared play experience is created based on the sharing of the code.

In some implementations, the code may be used to create a pool of players that can share the benefits of the code's distribution and use. For instance, a number of originating players may be identified when a code is generated. As the code is shared and used by other players, then each of the originating players may receive some benefits associated with use of the code. Again, benefits awarded to some or all of the players in the pool of players may include awarding particular symbol sets, awarding free spins, awarding free food/drink, awarding cinema tickets, awarding in-game features, awarding improved odds for sports wagers, etc. The number of players in the pool may determine the number and types of awards given to each of the players.

Different codes may be suggested to players at various intervals. The codes may correspond to predefined promotions and may, therefore, have particular game play requirements associated therewith along with particular benefits associated therewith. Other implementations may enable the originating player(s) to select features or restrictions of the code when generating the code. In some embodiments, shareable codes may be generated to include one or more code parameters (e.g., features or restrictions of the code). For instance, an originating player or code generator may define one or more code parameters, which may include: the games with which the code will work (or not work); sharing thresholds required to obtain benefits or rewards; game play achievements required to obtain benefits or rewards; the particular benefits associated with gameplay or sharing achievements; and combinations thereof. In some implementations, the system may automatically define or restrict the code parameters that can be selected by the originating player or code generator, possibly based on a membership level possessed by the originating player or code generator.

The shareable code may have an expiration associated therewith. Again, the expiration, time-to-live, or shelf-life of a code may be programmatically defined or may be defined by the originating player. The expiration of a shareable code may be determined, at least in part, upon a membership level associated with the originating player or code generator. In some embodiments, a shareable code may expire upon one or more events occurring (e.g., a game starting, a tournament starting, etc.). In some embodiments, a shareable code may expire upon being shared and used more than a predetermined number of time.

The originating player may be allowed to specifically identify the other players with which the code will be shared. Alternatively, the system may recommend players to receive the code. Such recommendations may correspond to specific recommendations of individuals or to groups of individuals that meet certain criteria (e.g., players that are currently playing a particular game and have their mobile device paired to an EGM, players that are not involved in a gaming session with an EGM but have their mobile device paired to a common EGM, etc.). In this way, the system may help the originating player further distribute a newly-created code.

In some embodiments, a shareable code may be generated and shared using the following process. An originating player may download a predetermined application (e.g., Cesar's application) on their mobile device. After downloading the application, the originating player is provided with a subscription/membership opportunity, which may include the ability to generate shareable codes. The originating player purchases a subscription/membership and based on the purchase level (e.g., silver, gold, platinum, etc.), the flexibility and benefits associated with code sharing are determined. Eventually, the originating player utilizes the application to generate a first code. During the process, the originating player is allowed to define parameters of the first code including initial recipients (individuals or groups), possible rewards for the originating player and/or for players that eventually receive and used the shared code, thresholds to obtain rewards, time/game limitations, further sharing permissions, etc. The code is then generated by the system backend with the defined parameters. Once generated, the code is sent to the originating player's mobile device as well as any initially-defined recipients. As the code is used and shared, the originating player is provided with rewards as thresholds are met/exceeded.

While examples and embodiments will be described herein with reference to an originating player or code generator, it should be appreciated that codes may be generated by a group of players rather than an individual. Thus, reference to an originating player or code generator may include reference to an individual that is part of a group and the group may have defined the code parameters associated with the shareable code.

Gaming System

With reference initially to FIG. 1, details of an illustrative gaming system 100 will be described in accordance with at least some embodiments of the present disclosure. The components of the system 100, while depicted as having particular instructions and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include one or more communication networks 104 that interconnect and facilitate machine-to-machine communications between one or multiple gaming machines 108, one or more mobile devices 124, and a game management system 116. As will be described in further detail herein, the game management system 116 may include one or multiple servers that are configured to facilitate gameplay and/or facilitate the generation, distribution, and rewarding associated with the consumption of shareable codes.

It should be appreciated that a communication network 104 may correspond to one or many communication networks without departing from the scope of the present disclosure. In some embodiments, the gaming machines 108, mobile devices 124, and game management system 116 may be configured to communicate using various nodes or components of a communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming machines 108 may be distributed throughout a single property or premises (e.g., a single casino floor) or the gaming machines 108 may be distributed among a plurality of different properties. In a situation where the gaming machines 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 108 may utilize the same or different types of communication protocols to connect with the communication network 104. It should also be appreciated that the gaming machines 108 may or may not present the same type of game or wagering interface to a player 112. For instance, a first gaming machine 108 may correspond to a gaming machine that presents a slot game to the player 112, the second gaming machine 108 may correspond to a sports betting terminal, and other gaming machines 108 may present other types of games or a plurality of different games for selection and eventual play by a player 112. It may be possible for the some of the gaming machines 108 to communicate with one another via a communication network 104.

A gaming machine 108 may correspond to a type of device that enables player interaction in connection with making wagers, communicating, watching live competitive contests, playing games of chance, and/or playing games of skill. For instance, the gaming machines 108 may correspond to a type of device that enables a first player 112 to interact with a second player 112 at respective gaming machines 108. In other embodiments, each player 112 may be enabled to play a game individually at a gaming machine 108.

As will be discussed in further detail herein, a player 112 may be allowed to carry a mobile device 124 and/or a credential 128. The mobile device 124 may correspond to a mobile communication device such as a cellular phone, a smart phone, a laptop, a tablet, a wearable device, etc. As will be discussed in further detail herein, a mobile device 124 may also be configured to facilitate gameplay with a player 112. In other words, components depicted and described as being included in a gaming machine 108 may also be included in a mobile device 124 without departing from the scope of the present disclosure.

In some embodiments, the credential 128 may correspond to a player loyalty card, a player tag, a wristband, a wearable device, or any other device that can be used by the player 112 to indicate their identity to a gaming machine 108 and/or to indicate a membership level to a gaming machine 108. Although one of the players 112 is depicted as carrying two physically separate devices (e.g., a mobile device 124 and a credential 128), it should be appreciated that the player 112 may carry a single device that provides the combined functionality of a mobile device 124 and a credential 128. In other words, a mobile device 124 may be considered a credential 128 or include components of a credential 128 without departing from the scope of the present disclosure. Presentation of a mobile device 124 and/or credential 128 to a gaming machine 108 may enable the player 112 to create a player account, login or register their presence at a particular gaming machine 108 with respect to the game management system 116, generate a shareable code at the gaming machine 108, consume a shareable code at the gaming machine 108, or perform other functions with respect to a particular game management system 116. As will be discussed in further detail herein, one or more of the credentials may be used to log the player 112 into a game management system 116 in addition to enabling the player 112 to create, receive, use, and/or distribute a shareable code.

A player 112 does not necessarily need to carry a mobile device 124 and credential 128 to create, receive, use, generate, and/or distribute a shareable code. Rather, some or all of these capabilities associated with a shareable code may be facilitated by the gaming machine 108. Alternatively or additionally, a player 112 may be allowed to create, receive, use, generator, and/or distribute a shareable code entirely with their mobile device 124.

In some embodiments, a player 112 may login to the game management system 116 by presenting their mobile device 124 and/or credential 128 to a gaming machine 108, which causes components of the gaming machine 108 to initiate a login process with the game management system 116 on behalf of the player 112.

In some embodiments, the game management system 116 may correspond to a system used within a casino to manage slot games, video poker games, bingo games, keno games, or the like that are played on one or more of the gaming machines 108. Alternatively or additionally, the game management system 116 may correspond to a system used within the casino to manage sports wagers placed by players 112 either at a sports desk or at a gaming machine 108. It should be appreciated that the game management system 116 may include one or multiple servers that execute instructions in connection with managing the games or wager capabilities made available at the gaming machines 108. It should also be appreciated that the game management system 116 may include one or multiple servers that execute instructions in connection with managing the generation, distribution, and usage of shareable codes.

The act of logging into the game management system 116 may enable the player 112 to receive additional playing benefits (e.g., loyalty benefits), maintain or track wager activity, purchase additional wager or gameplay credits, generate shareable codes, use shareable codes, and the like. Furthermore, if a player account does not exist for the player 112 within a particular game management system, then the gaming machine 108 and/or mobile device 124 may be configured to facilitate the creation of a player account for the player 112 within the game management system 116. The creation of the player account within any particular game management system may or may not utilize at least some of the information also used to log the player 112 into their other player account established with the other game management system.

As shown in FIG. 1, the game management system 116 may utilize one or more databases 120 to track player 112 activity with respect to the gaming machine 108, with respect to shareable codes, and the like. For instance, if the game management system 116 corresponds to a Patron Tracking System (PTS), then games played at the gaming machines 108, credits wagered in a slot game, credits won in a slot game, etc. may correspond to the types of player 112 activities tracked by the game management system 116. Similarly, the game management system 116 may utilize the database 120 to track player 112 activity with respect to sports wagers, shareable codes, group gaming events, etc.

The illustrative database 120 is shown to include data fields used to track player 112 activity with respect to games of chance, games of skill played, sports wagering games, as well as information associated with shareable codes. The illustrative, but non-limiting, data fields may include a tag ID field 132, a player information field 136, a shareable code(s) field 140, a player ID field 144, a group status field 148, a login status field 152. The tag ID field 132 may correspond to a field used to store an identification number or string that uniquely identifies a credential 128, mobile device 124, or application on a mobile device 124 carried by the player 112 from among other devices used by other players 112. The format of the identification number or string used to in the tag ID field 132 may be specific to the game management system 116 and can correspond to any alphanumeric sequence or any length (e.g., 1 bit, 2 bits, . . . N bits).

The player information field 136 may be used to store information describing a player 112 with respect to the game management system 116. For instance, the player information field 136 may be used to store information describing whether or not the player 112 has a loyalty status with a particular casino, has downloaded a particular application on their mobile device 124, whether the player 112 is a VIP within the casino, historical gameplay information for the player 112 (e.g., casino visit times, durations, winnings, losses, etc.). In some embodiments, the information maintained in the player information field 144 may be unique to particular games played by the player 112 at gaming machines 108 and may describe the types of games historically played by the player 112.

The shareable code(s) field 140 may include information describing or identifying shareable codes that have been generated or requested by the player 112, shareable codes that have been shared by the player 112, a use or sharing status associated with shareable codes, a consumption history for shareable codes, whether the player 112 has consumed shareable codes generated by other players 112, whether the player 112 is included in a player pool that was generated with the help of a shareable code, etc. The shareable code(s) field 140 may alternatively or additionally store code parameters for codes that have been created by the player 112.

The player ID field 144 may be used to store an identification number or string that uniquely identifies the player 112 from among other players. As an example, the player ID field 144 may store a player loyalty identification number and may have a particular format associated therewith (e.g., a required length, a number of bits, permissible symbols, etc.) In some embodiments, the player ID assigned to a player 112 may be uniquely assigned by a casino that administers the game management system 116.

The group status field 148 may be used to store a current status of a pool of players 112 that have been established with a shareable code 140. Group status information that may be contained in the group status field 148 may include a number of players 112 that have redeemed or consumed a shareable code to join a pool of players, a number of spots available for a pool of players, an amount of time left until a shareable code is no longer redeemable and the pool of players becomes closed, an identification of players 112 that have joined a pool of players, etc. The group status field 148 may also be used to store historical group information for the player 112 and with respect to historical activities associated with codes previously shared by the player 112 to create a pool of players.

The gameplay status field 152 may be used to store information describing a player's 112 gameplay status at a gaming machine 108. For instance, the gameplay status field 152 may store information describing wager history, credit in information, credit out information, duration of a gaming session with a particular gaming machine 108, and other information that is known to be tracked by the first game management system 116.

As mentioned above, a gaming machine 108 may include any type of known device such as a slot machine, a sports wagering terminal, an electronic table game (e.g., video poker), a skill-based game, etc. The gaming machine 108 can be in the form of an EGM, virtual gaming machine, video game gambling machine, etc. Similarly, a mobile device 124 may be configured to facilitate gameplay or gaming sessions between the player 112 and a game. In some embodiments, a player 112 may use their mobile device 124 and/or a gaming machine 108 to generate a shareable code. Similarly, in some embodiments, a player 112 may use a mobile device 124 and/or a gaming machine 108 to redeem or consume a shareable code generated by another player 112. Details of gameplay, gaming sessions, code generation, code sharing, and code consumption will be described as being facilitated by a computational device, which may include a gaming machine 108, a mobile device 124, and/or any other suitable machine that contains the components and provides the functions associated with a shareable code described herein.

Computational Device

Figure 2:
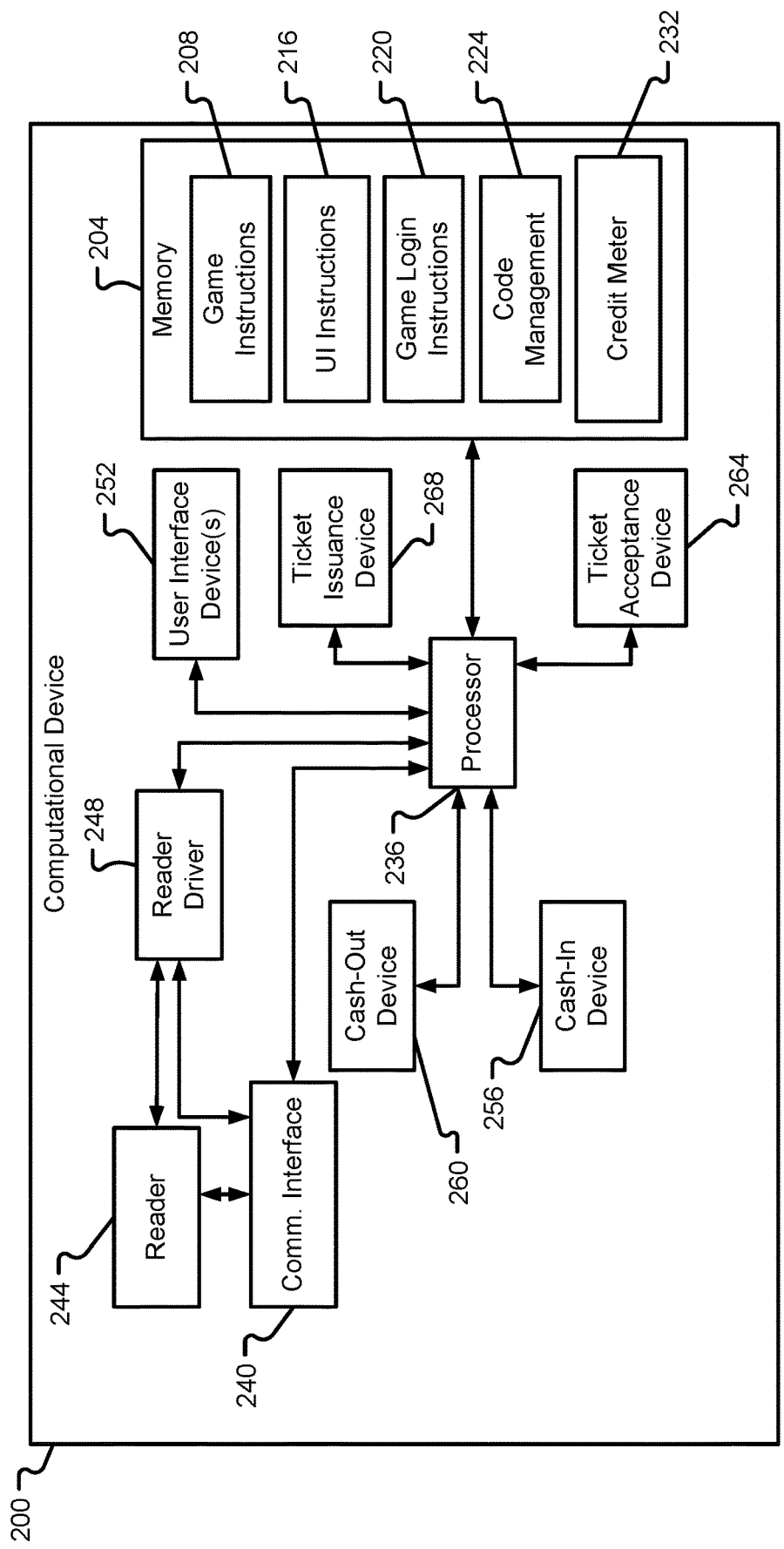
FIG. 2 is a block diagram depicting details of a computational device in accordance with embodiments of the present disclosure.

With reference now to FIG. 2, additional details of a computational device 200 will be described in accordance with at least some embodiments of the present disclosure. While depicted as a single computational device 200, it should be appreciated that some or all of the components of a single computational device 200 may be distributed across multiple devices (e.g., gaming machines 108 (of the same or different type), mobile device 124, etc.) without departing from the scope of the present disclosure. Again, it should also be appreciated that one or more features of a computational device 200 may be provided in a player's 112 mobile device 124, in a gaming machine 108, or a combination thereof without departing from the scope of the present disclosure.

The computational device 200 is shown to include memory 204, a processor 236, a communication interface 240, a reader 244, a reader driver 248, a cash-in device 256, a cash-out device 260, a ticket acceptance device 264, a ticket issuance device 268, and one or more user interface devices 252.

The processor 236 may include one or multiple computer processing devices. In some embodiments, the processor 236 may include a microprocessor, a Central Processing Unit (CPU), a Graphics Processing Unit (GPU), a microcontroller, or the like. The processor 236 may also be configured to execute one or more instructions stored in memory 204.

The memory 204 may include one or multiple computer memory devices that are volatile or non-volatile. Non-limiting examples of memory 204 include Random Access Memory (RAM), Read Only Memory (ROM), flash memory, Electronically-Erasable Programmable ROM (EEPROM), Dynamic RAM (DRAM), etc. The memory 204 may be configured to store instructions that enable player 112 interaction with the computational device 200, that enable the computational device 200 to interact with the game management system 116, that enable the player 112 to create a player account with the game management system 116, that enable the computational device 200 to provide a player 112 with the ability to login to the game management system 116, and/or enable the player 112 to request/receive/share/consume shareable codes with other players 112. Examples of instructions that may be stored in the memory 204 include game instructions 208, User Interface (UI) instructions 216, game login instructions 220, and code management instructions 224.

The game instructions 208, when executed by the processor 236, may enable the computational device 200 to facilitate one or more games of chance or skill and produce interactions between the player 112 and the game of chance or skill. In some embodiments, the game instructions 208 may include subroutines that present one or more graphics to the player 112 via a user interface, subroutines that calculate whether a particular game wager has resulted in a win or loss during the game of chance or skill, subroutines for determining payouts for the player 112 in the event of a win, subroutines for exchanging communications with the game management system 116 via the communication interface 240, and any other subroutine or set of instructions that facilitate gameplay at or in association with the computational device 200. Alternatively or additionally, the game instructions 208 may include instructions that enable the player 112 to place wagers on sporting events, watch live sporting events via the computational device 200, track a status of wagers placed on sporting events, track a status of events occurring in sporting events, and the like.

The UI instructions 216, when executed by the processor 236, may enable the computational device 200 to render or present various information and prompts to the player 112 via one or more user interface devices 252 of the computational device 200. For instance, the UI instructions 216 may enable the computational device 200 to present prompts to the player 112 via the one or more user interface devices 252. Examples of user interface device(s) 252 include, without limitation, user input devices (e.g., buttons, microphones, touch-sensitive sensors, optical sensors, motion sensors, proximity sensors, etc.), user output devices (e.g., display screens, lights, speakers, haptic feedback devices, etc.), and combination user input/output devices (e.g., touch-sensitive displays, etc.). The UI instructions 216 may also include drivers for the user interface device(s) 252 and/or other firmware that enables control of the user interface device(s) 252 in accordance with inputs received from other instructions stored in memory 204.

The game login instructions 220, when executed by the processor 236 and/or reader driver 248 and/or communication interface 240, may enable the computational device 200 to initiate a login process for a player 112 with the game management system 116. In some embodiments, the login process for the game management system 116 may be initiated automatically in response to a card read event occurring at the reader 244. In some embodiments, the login process for the game management system 116 may be initiated in response to registering a credential read event at the reader 244. Alternatively or additionally, the login process for the game management system 116 may be initiated in response to reading data from the mobile device 124 and/or credential 128 and confirming a validity of the data read from the mobile device 124 and/or credential 128.

The code management instructions 224, when executed by the processor 236, may enable the computational device 200 to interact with the game management system 116 for purposes of requesting, generating, receiving, sharing, and/or consuming shareable codes. In some embodiments, the code management instructions 224 may be configured to receive shareable codes, store shareable codes in memory 204 for later use, access shareable codes created by another player 112 when redemption or consumption of the shareable codes is desired, access shareable codes previously generated by the player 112 for purposes of sharing the shareable codes, determine a sharing status associated with shareable codes, and perform any other function associated with a shareable code. As a non-limiting example, the code management instructions 224 may be configured to receive a shareable code, generate a code usage message when the shareable code is being used in connection with game instructions 208, transmit a code usage message to the game management game management system 116 when the shareable code is being used in connection with game instructions 208, receive a game initiation message from the game management session in response to a shareable code being redeemed or consumed, and automatically initiate game instructions 208 based on information contained in a game initiation message. For instance, the code management instructions 224 may be configured to receive a shareable code which includes an identifier of a game and instructions that automatically initiate the game when the shareable code is consumed. Thus, the code management instructions 224 may be configured to call the game instructions 208 based on information contained in a shareable code (e.g., information like an identifier of a game and/or instructions contained in a shareable code to initiate the game).

The credit meter 232 may correspond to a device or collection of devices that facilitates a tracking of wager activity or available wager credits at the computational device 200. Such credits may be made available for wagers or bets placed on a game managed by the game management system 116. In some embodiments, the credit meter 232 may be used to store or log information related to various player 112 activities and events that occur at the computational device 200. The types of information that may be maintained in the credit meter 232 include, without limitation, player information, available credit information, wager amount information, and other types of information that may or may not need to be recorded for purposes of accounting for wagers placed at the computational device 200 and payouts made for a player 112 during a game of chance or skill played at the computational device 200. In some embodiments, the credit meter 232 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the computational device 200, and the like. Some or all of the data within the credit meter 232 may be reported to the game management system 116. As an example, the number, value, and timing of wagers placed by a particular player 112 and payouts on such wagers may be reported.

The cash-in device 256 may include a bill acceptor, a coin acceptor, a chip acceptor or reader, or the like. In some embodiments, the cash-in device 256 may also include credit card reader hardware and/or software. The cash-out device 260 may operate and issue cash, coins, tokens, or chips based on an amount indicated within the credit meter 232. In some embodiments, the cash-out device 260 may include a coin tray or the like and counting hardware configured to count and distribute an appropriate amount of coins or tokens based on a player's 112 winnings or available credit within the credit meter 232.

The computational device 200 may also be provided with a ticket acceptance device 264 that is configured to accept or scan physically-printed tickets/vouchers and extract appropriate information therefrom. In some embodiments, the ticket acceptance device 264 may include one or more machine vision devices (e.g., a camera, IR scanner, optical scanner, barcode scanner, etc.), a physical ticket acceptor, a shredder, etc. The ticket acceptance device 264 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 112 mobile device 124, for example.

The ticket issuance device 268 may be configured to print or provide physical tickets/vouchers to players 112. In some embodiments, the ticket issuance device 268 may be configured to issue a ticket/voucher consistent with an amount of credit available to a player 112, possibly as indicated within the credit meter 232.

As mentioned above, the user interface device(s) 272 may correspond to any type of mechanical or software-based input and/or output device. In some embodiments, the user interface device(s) 272 may be provided on a common panel or portion of the computational device 200 and may be used to initiate a predetermined function in response to being pressed by the player 112. In addition to the examples of user interface devices 272 described above, it should be appreciated that a user interface device 272 may alternatively or additionally take the form of one or more depressible buttons, a lever or "one armed bandit handle," etc.

The illustrative computational device 200 is also shown to include a communication interface 240. In the depicted embodiment, the reader 244 is in direct communication with the communication interface 240. It should be appreciated, however, that such a direct connection is not required. Rather, for example, the reader 244 may be directly connected to the processor 236. In some embodiments, the communication interface 240 may correspond to a component of the computational device 200 that has the reader 244 integrated therewith. As a more specific but non-limiting example, the communication interface 240 may correspond to a SMIB and the reader 244 may be integrated with the SMIB. In some embodiments, the communication interface 240 communicates with the processor 236 using a Slot Accounting System (SAS) protocol. The communication interface 240 may enable the computational device 200 to interact with the game management system 116. All elements of the computational device 200 may be considered to be coupled to one another, regardless of whether or not such coupling is direct or indirect. For instance, the processor 236 may be considered to be coupled to the reader 244 via the communication interface 240. In other words, "coupling" as used herein does not necessarily require a direct communication between components.

The nature of the communication interface 240 may depend upon the protocol and/or networking requirements of the game management system 116. Examples of a suitable communication interface 240 include, without limitation, an Ethernet port, a USB port, an RS-232 port, an RS-485 port, a NIC, an antenna, a driver circuit, a modulator/demodulator, etc. The communication interface 240 may include one or multiple different network interfaces depending upon whether one or multiple network connections are required to facilitate interactions with the game management system 116 or the network 104. For instance, the computational device 200 may be provided with both a wired network interface and a wireless network interface without departing from the scope of the present disclosure. In some embodiments, the communication interface 240 may include different communications ports that interconnect with various input/output lines.

The reader 244 may be configured to read credentials of different types. For instance, the reader 244 may be configured to read the credential 128 or similar cards that operate with a similar protocol or utilize a similar data format. The reader 244 may also be configured to read cards or credentials of other types (e.g., the mobile device 124). For instance, the reader 244 may be configured to wirelessly or by contact read a mobile device 124 and/or credential 128.

The format or form factor of a credential 128 should not be limited to any particular type of format or form factor. Examples of suitable form factors that may be used for a credential 128 include, without limitation, magstripe cards, chip-based cards, contactless/wireless cards, key fobs, mobile communication devices (e.g., mobile device 124), optically-readable cards, or the like. It should be appreciated that one or both of the mobile device 124 and credential 128 may be capable of being read by a reader 244 when brought within a predetermined distance of the reader 244 (e.g., if the reader 244 includes an antenna and is utilize a contactless communication protocol like Near Field Communications (NFC) or Bluetooth). Alternatively or additionally, a credential 128 may be capable of being read by a reader 244 when inserted to a slot of a card reader 244 or swiped through a card reader 244. To the extent that the form factor of a credential 128 can vary and is not limited, it should be appreciated that the reader 244 may be provided with any number of hardware and/or software components to enable interactions with a credential 128. More specifically, each a reader 244 may include one or multiple readers, each of which may be provided with appropriate hardware and/or software components to enable the reader 244 to extract/read data that is stored on a credential 128. As an example, a reader 244 may be configured to read or extract a shared code from a credential 128 or from a mobile device 124.

In some embodiments, when the reader 244 is used to read data from a credential 128, the data read from the credential 128 may be provided directly to the communication interface 240. The communication interface 240 may be configured to provide some or all of the data from the credential 128 directly to the game management system 116 (e.g., without providing the data first to the processor 236). The communication interface 240 may then provide some or all of the data from the credential 128 to the processor 236 or may inform the processor 236 of a card read event. In some embodiments, the communication interface 240 may not necessarily provide any data from the credential 128 to the game management system 116. Rather, upon reading data from the credential 128, the communication interface 240 may automatically initiate a login process for the player 112 that presented the credential 128 to the reader 244. Alternatively or additionally, upon reading a shared code from the credential 128, the communication interface 240 may automatically initiate a code redemption process for the player 112 by sending a code usage message to the game management system 116.

Game Management System

Figure 3:
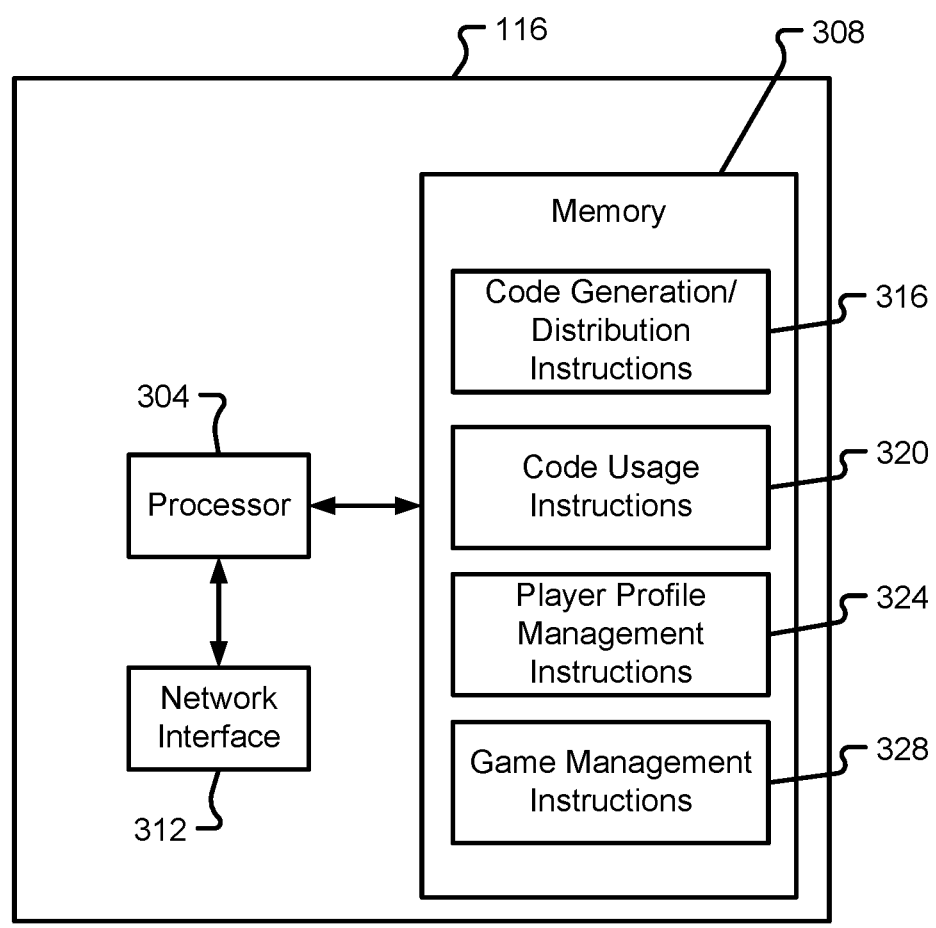
FIG. 3 is a block diagram depicting details of a game management system in accordance with embodiments of the present disclosure.

With reference now to FIG. 3, additional details of a game management system 116 will be described in accordance with at least some embodiments of the present disclosure. While depicted as a single device (e.g., as a single server), it should be appreciated that some or all of the components of a game management system 116 may be distributed across multiple devices without departing from the scope of the present disclosure. For instance, the game management system 116 may include one or more servers for tracking player progress, one or more different servers for managing code usage and sharing (e.g., a code authentication server), one or more different servers for managing pools of players 112 established with a shared code, etc.

The game management system 116 is shown as a server to include a processor 304, memory 308, and a network interface 312. These resources may enable functionality of the game management system 116 as will be described herein. For instance, the network interface 312 provides the game management system 116 with the ability to send and receive communication packets or the like over the communication network 104. The network interface 312 may be provided as a network interface card (NIC), a Slot Machine Interface Board (SMIB), a network port, a modem, drivers for the same, and the like. Communications between the components of the game management system 116 and other devices connected to the communication network 104 may all flow through the network interface 312.

The processor 304 may correspond to one or many computer processing devices. For instance, the processor 304 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 304 may be provided as a microprocessor, a CPU, a GPU, or plurality of microprocessors that are configured to execute the instructions sets stored in memory 308. Upon executing the instruction sets stored in memory 308, the processor 304 enables various game management, player authentication, code authentication, code generation, code distribution, and wager management functions of the game management system 116.

The memory 308 may include any type of computer memory device or collection of computer memory devices. Non-limiting examples of memory 308 include RAM, ROM, flash memory, EEEPROM, DRAM, etc. The memory 308 may be configured to store the instructions depicted in addition to temporarily storing data for the processor 304 to execute various types of routines or functions. As an example, the memory 308 may a player profile management instruction set 324 that enables the processor 304 to store data into a player profile in database 120.

In addition to managing player profile information, the game management system 116 may also be provided with a code generation and distribution instruction set 316 that, when executed by the processor 304, enable the game management system 116 to receive code request messages, analyze information contained in code request messages, and respond to code request messages as appropriate. The code generation and distribution instruction set 316 may alternatively or additionally be configured to automatically distribute a shareable code generated for one player 112 among a number of other players 112 (e.g., where the code request message identified specific players 112 to receive the shareable code or where the code request message identified criteria for distributing the shareable code to qualified players 112). In this way, the game management system 116 may be configured to generate and distribute shareable codes to code requestors and/or players 112 that will eventually consume or redeem the code.

The memory 308 may also include code usage instructions 320. While depicted as being separate from the code generation and distribution instruction set 316, it should be appreciated that functionality of the code usage instructions 320 could be implemented as part of the code generation and distribution instructions 316. The code usage instructions 320, when executed by the processor 304, may enable the game management system 116 to track a number of players 112 that have redeemed or used a code, track an expiration associated with a code, analyze a code usage message indicating a player's 112 attempt to redeem or consume a code, and update electronic record(s) in the database 120 to reflect whether and when a code has been redeemed by a qualified player 112.

The memory 308 is also depicted to include a game management instruction set 328. The game management instruction set 328, when executed by the processor 304, may enable the game management system 116 to facilitate various gameplay features and functions at the gaming machines 108, mobile devices 124, or any other computational device 200. For instance, the game management instruction set 328 may be configured to manage wagers placed by players 112 at computational devices 200, track game states at computational devices 200, determine outputs to provide to the player 112 via a computational device 200, and/or manage game rules, settings, or preferences within the gaming system 100.

The player profile management instruction set 324, when executed by the processor 304, may enable the game management system 116 to manage one or more data fields for a player profile, for example, stored in the database 120. In some embodiments, the player profile management instruction set 324 may be configured to create and manage one or more player profiles and associated data structures within the database 120. A player profile, in some embodiments, may include player 112 identification information and a wager account record for the player as well as shareable codes that have been provided to the player 112 or distributed on behalf of the player 112. In some embodiments, the player profile management instruction set 324 may be responsible for managing electronic records of all players 112 within the gaming system 100 or a subset of players 112 within the gaming system 100. In some embodiments, the player profile management instruction set 324 may be responsible for updating a player profile to indicate that an associated player 112 is attempting to earn a bonus or jackpot based on an aggregation of events that can occur within the gaming system 100. The player profile management instruction set 324 may be configured to work in synchronization with the code usage instruction set 320 to update a player profile in response to a player 112 distributing a shareable code and/or in response to other players consuming or redeeming a code generated by the player 112.

Player Groups and Player Pools

Figure 4A:
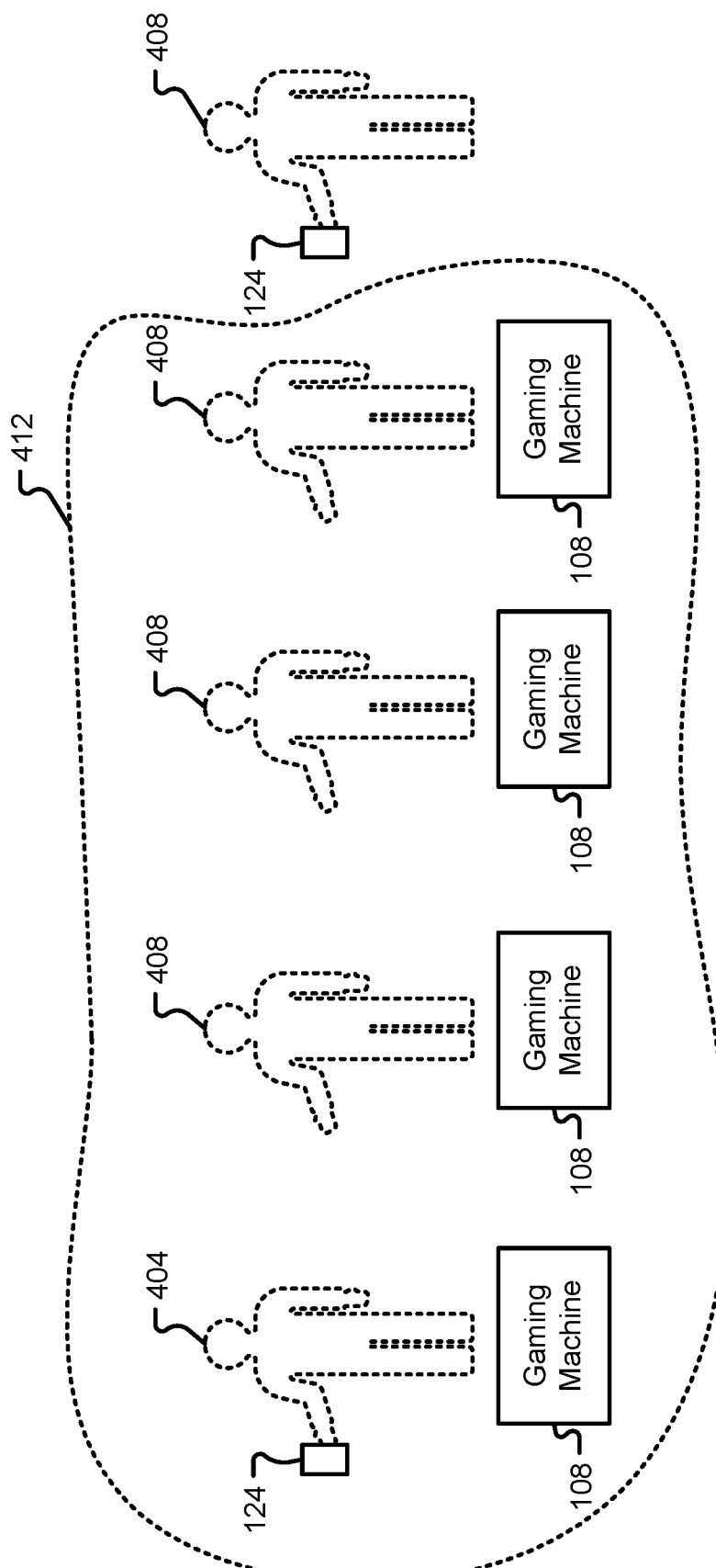
FIG. 4A is a block diagram illustrating a first player pool in accordance with embodiments of the present disclosure.

With reference now to FIGS. 4A-4D, additional details of ways in which a shareable code can be used to facilitate player 112 interactions will be described in accordance with at least some embodiments of the present disclosure. Referring initially to FIG. 4A, a first pool of players 412 is created when a first player 404 (e.g., an originating player or code requestor) initiates the generation of a shareable code and when a number of second players 408 (e.g., players 112 other than the first player 404) consume or redeem the code created by the first player 404. As shown in FIG. 4A, the pool of players 412 may include some players that have a mobile device 124 and others that do not. In this particular example, the first player 404 may have defined that the code can only be redeemed or used with a particular gaming machine 108, a particular type of gaming machine 108, or a particular game offered by a gaming machine 108. In such a situation, to become part of the player pool 412, other second players 408 are required to redeem or use the code at a particular gaming machine 108 that complies with the restrictions defined in the code. Thus, a second player 408 that does not have access to a qualified gaming machine 108 may not be allowed to join the pool of players 412.

FIG. 4A also illustrates that the second players 408 do not necessarily need a mobile device 124 or the like to redeem the code. Instead, the second players 408 may enter or redeem the code directly at the gaming machine 108. In some embodiments, the game management instructions 328 may manage a common game played by the pool of players 412 (e.g., a slot tournament, a fantasy sports match, a friendly side-wager, etc.) that are playing the game on different gaming machines 108. In some embodiments, when each of the second players 408 redeems or enters a code at a qualified gaming machine 108, the appropriate game (e.g., the game instructions 208) may be automatically invoked by the code management instructions 224.

Figure 4B:
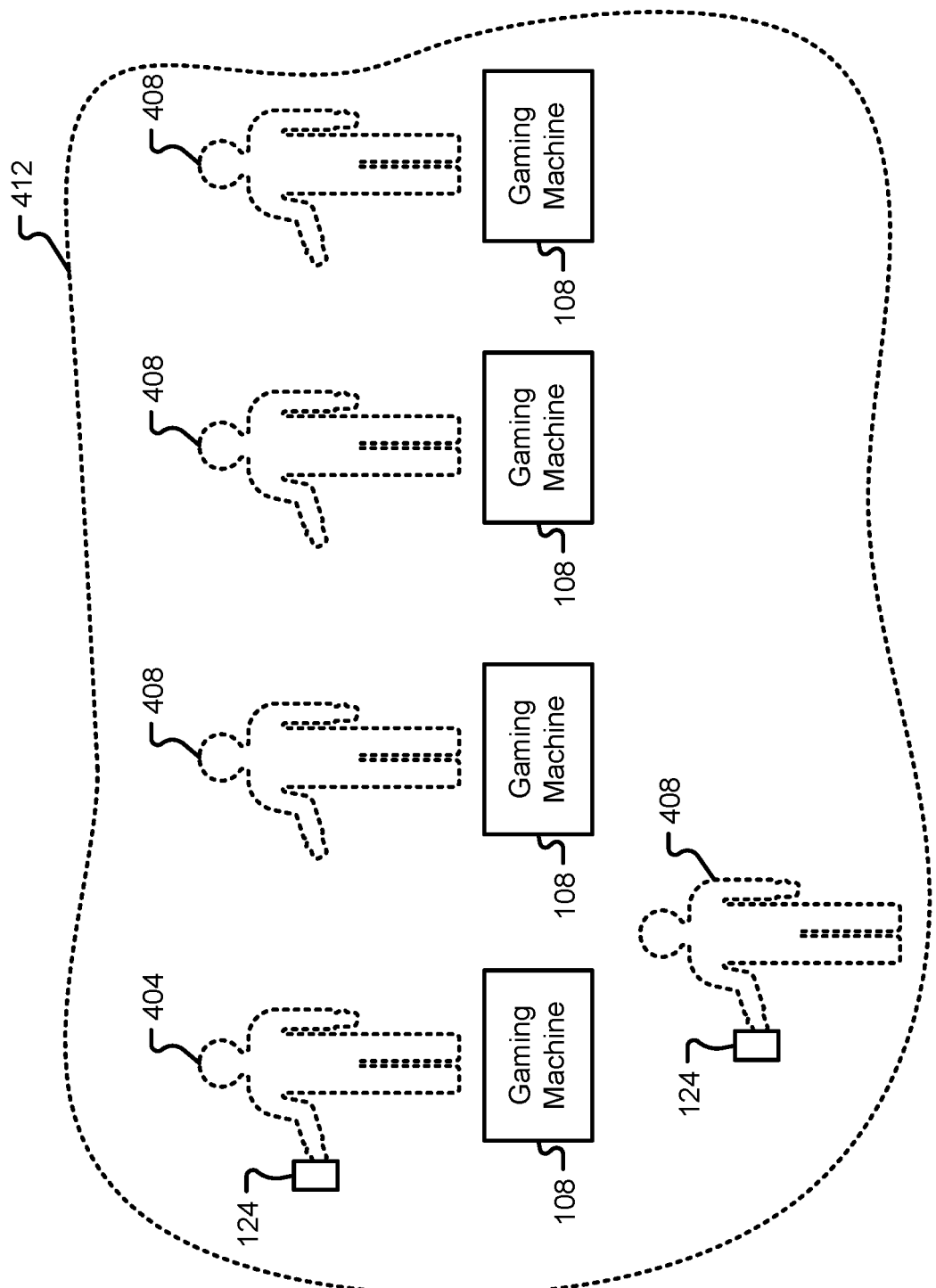
FIG. 4B is a block diagram illustrating a second player pool in accordance with embodiments of the present disclosure.

Referring now to FIG. 4B, a second possible configuration of a pool of players 412 is illustrated. In this configuration some of the second players 408 have joined the pool of players 412 at a gaming machine 108 while others of the second players 408 have joined the pool of players 412 at a mobile device 124. In this situation the code created by the first player 404 may have defined a particular game that is needed to redeem the code/join the pool of players 412, but the code may be agnostic with respect to the type of computational device 200 that is used to redeem the code. Thus, as long as a mobile device 124 includes a qualified game, the mobile device 124 may be used for code redemption by a second player 408.

FIG. 4C illustrates another possible configuration of a pool of players 412. This particular configuration shows that the first player 404 is positioned at a gaming machine 108 and does not necessarily use a mobile device 124 to generate a shareable code. Instead, the first player 404 may use the gaming machine 108 to request/generate the shareable code and then the second players 408 may redeem the shareable code with a mobile device 124. In some embodiments, the first player 404 may require that the code be redeemed only by second players 408 within a predetermined proximity (e.g., a wireless communication range, within the same building/casino, within view, within a certain distance, etc.) of their gaming machine 108. In some embodiments, the code may be created such that the code generation and distribution instructions 316 only distributes/shares the code with players 112 that are within the predetermined proximity of the gaming machine 108 at which the first player 404 is positioned. The code may be pushed by the game management system 116 to mobile devices 124 of qualified second players 408 and those second players 408 may be allowed to redeem the code at their mobile device 124. The code may further define that the second player 408 are only allowed to remain a part of the pool of players 412 as long as they remain within a predetermined proximity of the gaming machine 108.

When part of the pool of players 412, the first player 404 and second players 408 may be allowed to play a common game (e.g., a game hosted at the gaming machine 108) or to play different games. Moreover, in some embodiments, the players in the pool of players 412 may be allowed to work as a team toward completing certain achievements in a game hosted at the gaming machine 108. For example, all players in the pool of players 412 may play an instance of the game at their own personal computational device 200, but the credits/rewards earned by any of the players in the pool of players 412 may be contributed to a shared rewards pool that is later distributed among all players in the pool of players 412. As more second players 408 join the pool of players 412, the first player 404 may be provided with additional rewards or opportunities during their gaming session at the gaming machine 108. If some second players 408 refer or share the code with other second players 408, then the referring second players 408 may receive additional rewards or opportunities during the gaming session in addition to providing more rewards or opportunities to the first player 404.

In some embodiments, the pool of players 412 may exist for a predetermined amount of time or until a predetermined event occurs. An advantage of allowing the first player 404 to generate and share a code using the gaming machine 108 is that other players 408 are allowed to enjoy a game hosted by the gaming machine 108 even though the first player 404 is physically using the gaming machine 108. In other words, the physical availability of the gaming machine 108 does not limit the first player 404 and/or the gaming machine 108 from facilitating gameplay with a game hosted at the gaming machine 108 among a number of other players 408.

Figure 4D:
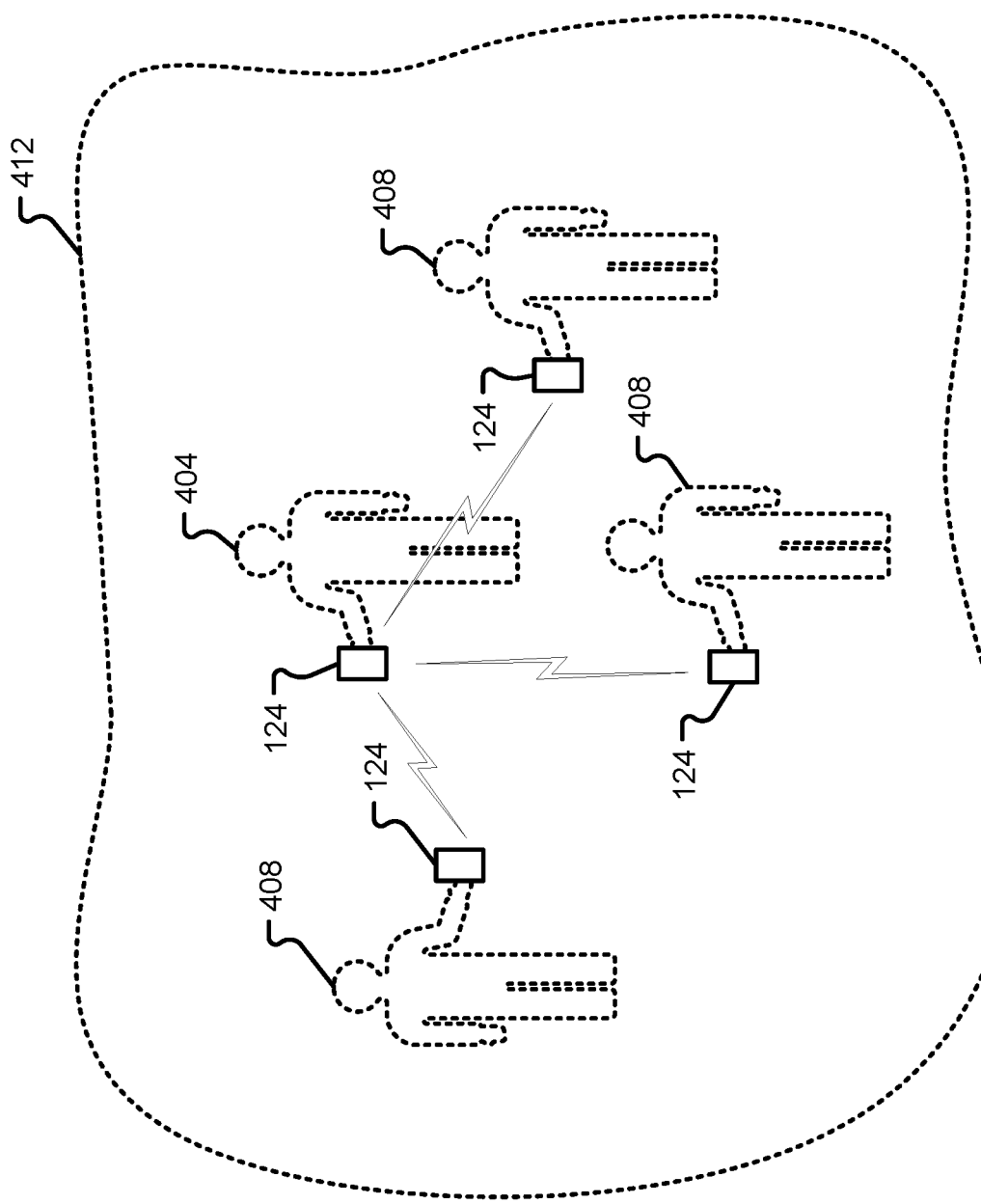
FIG. 4D is a block diagram illustrating a fourth player pool in accordance with embodiments of the present disclosure.

FIG. 4D illustrates yet another possible configuration for a pool of players 412. In this configuration the first player 404 is using a mobile device 124 as are the second players 408. The first player 404 may be playing a game on their mobile device 124 similar to the situation described in connection with FIG. 4C. Additionally, the first player 404 may use their mobile device 124 to generate/request the code that is eventually shared with the second players 408. In some embodiments, each player 404, 408 may be allowed to play a game or redeem the code using their own mobile device 124. In some embodiments, the game may be hosted at a mobile device 124 of one player and the mobile devices 124 of the other players may receive updates or notifications about the game. In some embodiments, the first player 404 may define code parameters that limit code redemption or code usage to other players 408 within a predetermined proximity (e.g., a wireless communication range, within the same building/casino, within view, within a certain distance, etc.) of the first player 404. The code parameters may alternatively or additionally require that the second players 408 have a predetermined application on their mobile device 124 or have the ability to play a predetermined game on their mobile device 124.

Methods

With reference now to FIGS. 5 to 9, various methods will be described in accordance with at least some embodiments of the present disclosure. It should be appreciated that the disclosed methods may be performed by one, some, or all of the devices depicted and described herein. Said another way, any device within the system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Figure 5:
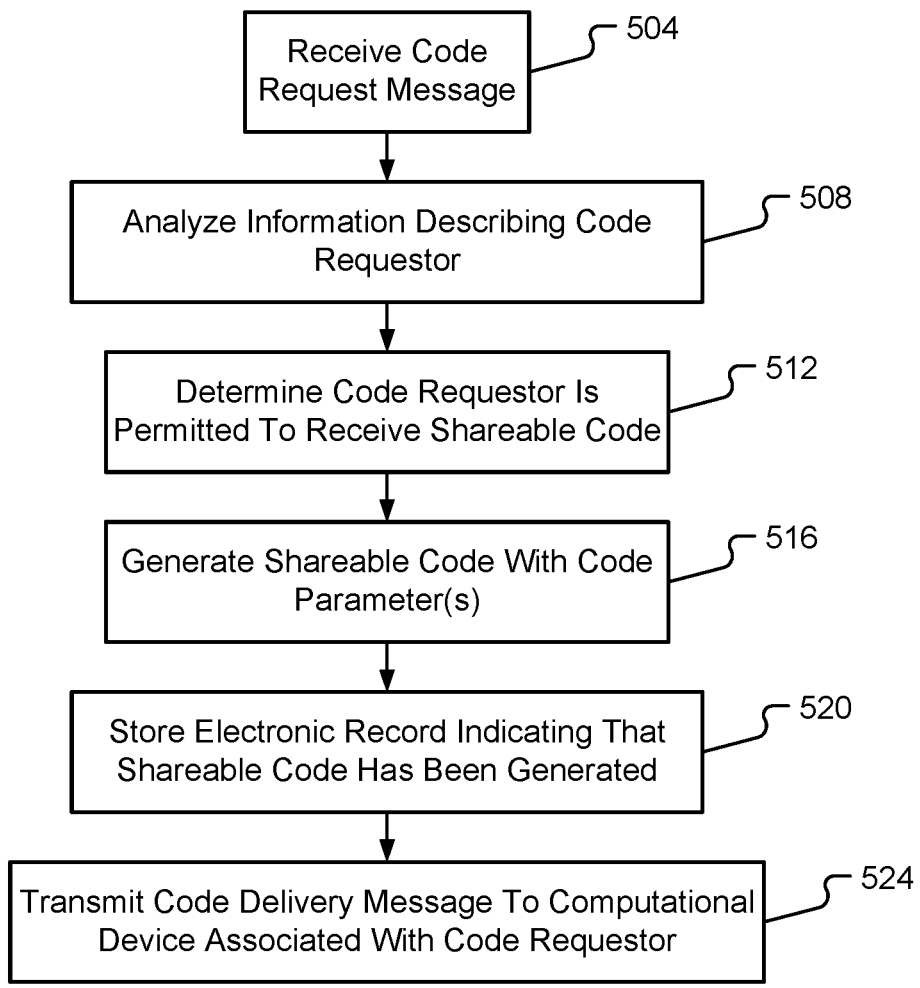
FIG. 5 is a flow diagram illustrating a method of generating a shareable code in accordance with embodiments of the present disclosure.

Referring initially to FIG. 5, a method of generating a shareable code and distributing the shareable code will be described in accordance with embodiments of the present disclosure. The method begins when a code request message is received at the game management system 116 (step 504). The code request message may have been transmitted by a computational device 200 being used by a first player 404. In some embodiments, the code request message may originate from a predetermined application on a mobile device 124. In some embodiments, the code request message may originate from code management instructions 224 of a computational device 200. The code request message may include information describing the first player 404 (e.g., a player 112 identification number, a username, a player 112 membership status, an identifier of an application or mobile device 124 associated with the player 112, a location of the player 112, etc.). The code request message may also include one or more code parameters. As described herein, the code parameter(s) may be defined by the player 112. Definition of a code parameter by the player 112 may be based on player 112 inputs provided during generation of the code request, based on a membership level of the player 112, based on preferences defined by the player 112, based on casino preferences or rules, or combinations thereof.

The method may continue with the code generation and distribution instructions 316 analyzing the code request message. Specifically, in some embodiments, the code generation and distribution instructions 316 may invoke a routine where the information describing the code requestor is analyzed (step 508). Based on the analysis of the information describing the code requestor, the code generation and distribution instructions 316 may determine that the code requestor is permitted or authorized to receive a shareable code (step 512). Alternatively or additionally, the code generation and distribution instructions 316 may determine that the code requestor is permitted to generate the shareable code, but the shareable code is directly transmitted by the game management system 116 to other players 408. The analysis in step 508 and the determination in step 512 may include analyzing a casino membership level associated with the code requestor, analyzing whether the code requestor has a particular application on their mobile device 124, whether the code requestor has the ability/permissions to request and receive a shareable code, etc. The analysis may also include determining whether the requested code parameters are permitted to be provided to the code requestor.

Upon determining that the code requestor is permitted to create/receive the shareable code with the code parameters defined by the code requestor (e.g., as contained in the code request message), the method may continue with the game management system 116 invoking the code generation and distribution instructions 316 to generate the shareable code with the requested code parameter(s) (step 516). The code generation and distribution instructions 316 may then invoke the player profile management instructions 324 to store one or more electronic records in the database 120 that indicate the shareable code has been generated for the code requestor (step 520). The electronic record may also indicate circumstances surrounding the generation of the shareable code (e.g., time of code generation, identification of code requestor, identification of code parameter(s), identification of targets or other players 112 to receive the code, etc.).

The method may also involve invoking the code generation and distribution instructions 316 to send a code delivery message to the computational device associated with the code requestor (step 524). In some embodiments, the code delivery message may include the shareable code, an identifier of the shareable code, and identifier of the code requestor, a descriptor of the code parameter(s), etc. Thus, the shareable code may be communicated to the code requestor, who can then share the code with other players 112 as desired. Alternatively or additionally, the code generation and distribution instructions 316 may be configured to automatically send the shareable code via one or more code delivery messages to players 112 other than the code requestor. For instance, the shareable code may be automatically transmitted to specifically-identified players 112 (e.g., friends of known acquaintances of the code requestor), to players 112 that meet requirements defined by the code parameter(s) of the shareable code (e.g., players 112 playing a certain game, players 112 having a certain membership level, players 112 within a predetermined proximity of the code requestor, players 112 that have their mobile device 124 paired with the computational device 200 that transmitted the code request message, players 112 that have their mobile device 124 paired with a predetermined gaming machine 108, players 112 playing a particular gaming machine 108, or combinations thereof).

Figure 6:
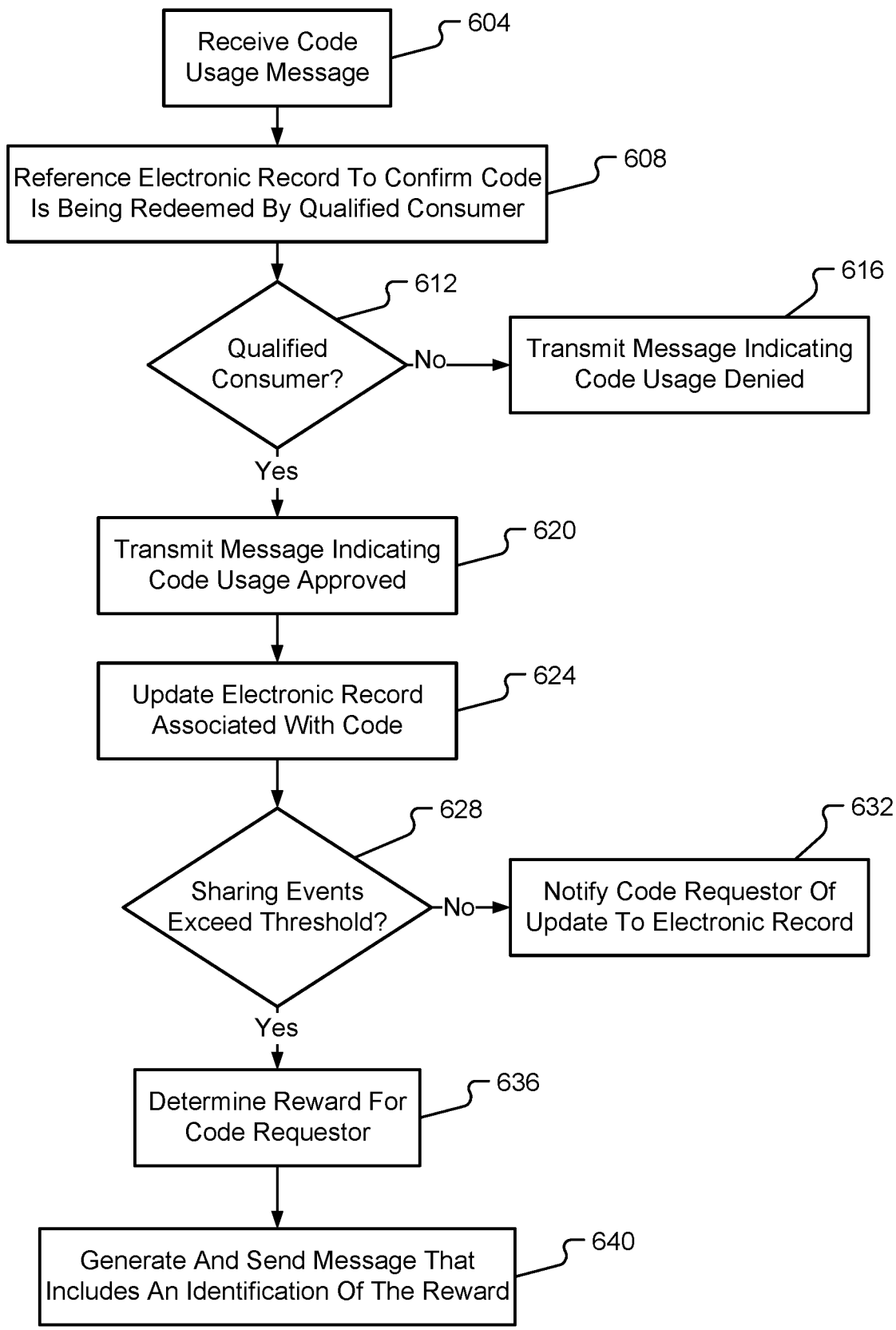
FIG. 6 is a flow diagram illustrating a method of authorizing code usage in accordance with embodiments of the present disclosure.

With reference now to FIG. 6, a method of authorizing code usage will be described in accordance with embodiments of the present disclosure. The method may begin when a code usage message is received at the game management system 116 (step 604). The code usage message may be received from a computational device 200 being used by a player 112 other than the player that generated or requested the shareable code.

The method may continue with the code usage instructions 320 referencing the electronic record associated with the code identified in the code usage message (step 608) to confirm that the code is being redeemed by a qualified player 112 (step 612). In some embodiments, a qualified consumer of a shareable code may correspond to a player 112 that satisfies any or all restrictions placed on the shareable code. Such restrictions may be defined as code parameters and may have been determined at the time of generating the shareable code. In some embodiments, qualification to redeem a code may also depend upon a validity or non-expiration of the code.

If the query of step 612 is answered negatively, then the method continues with the code usage instructions 320 generating and transmitting a message indicating that the code usage/redemption was denied (step 616). This particular step may involve sending a code denial message to the player 112 that requested to redeem the code and/or to the player 112 that originated the creation of the code.

If the query of step 612 is answered positively, then the method may continue with the code usage instructions 320 generating a message indicating that the code usage has been approved (step 620). The message may be transmitted to the computational device 200 that transmitted the code usage message and/or to a computational device 200 associated with the original code requestor. The message may be transmitted over the communication network 104. The method may also include the code usage instructions 320 invoking the player profile management instructions 324 to update the electronic record associated with the shareable code in the database 120 (step 624). As an example, the shareable code field 140 and/or group status field 148 may be updated to reflect that the shareable code has been redeemed. The electronic record may also be updated/incremented to indicate that a new sharing event (e.g., a code redemption) has occurred for the code.

Tracking the sharing events associated with the code may result in the code usage instructions 320 determining that the code creator has qualified for a particular reward or benefit. In some embodiments, the code usage instructions 320 may be configured to determine the number of sharing events associated with the shareable code and further determine if the number of sharing events exceeds a predetermined sharing threshold (step 628). If the number of sharing events associated with the shareable code exceeds the predetermined sharing threshold, then a reward may be determined for the code requestor (step 636). In some embodiments, the reward(s) for the code requestor may depend upon the nature and extent of the sharing event. For instance, certain sharing events may result in one type of reward for the code requestor whereas other sharing events may result in a different type of reward for the code requestor. The code usage instructions 320 may then generate a rewards message that includes an identification of the reward. The rewards message may be sent to the computational device associated with the code requestor (step 640). The rewards message may alternatively or additionally be sent to the player 112 that just redeemed or used the shareable code.

Referring back to step 628, if the number of sharing events has not yet exceeded the predetermined sharing threshold, then the code usage instructions 320 may notify the code requestor of the update to the electronic record, but not provide a reward to the code requestor (step 632). For instance, the code requestor may be notified of the increment in the number of times the shareable code has been redeemed and a number of sharing events remaining until a reward is earned.

Figure 7:
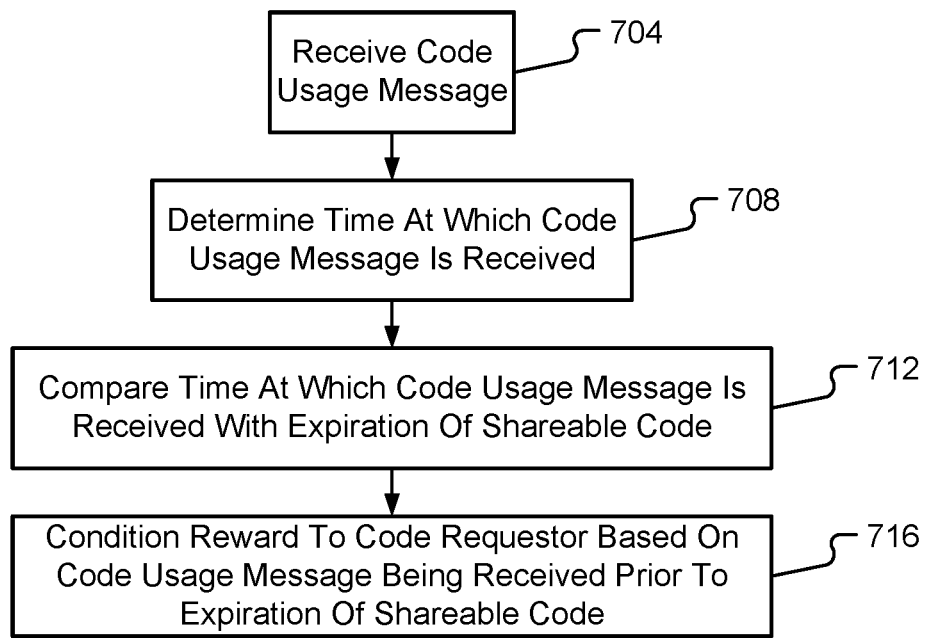
FIG. 7 is a flow diagram illustrating a method of confirming code validity in accordance with embodiments of the present disclosure.

With reference now to FIG. 7, a method of confirming code validity will be described in accordance with embodiments of the present disclosure. The method begins when a code usage message is received (step 704). This particular step may be similar or identical to step 604. The method continues with the code usage instructions 320 determining a time at which the code usage message was received (step 708). In some embodiments, the time at which the code message is received may substantially or roughly correspond to a time at which the code is redeemed. To determine the time of code redemption more accurately, the code usage instructions 320 may analyze a timestamp of the code usage message to determine when the message was sent by the computational device 200.

The code usage instructions 320 may then compare the time at which the code usage message is received (or sent) with the expiration of the shareable code (step 712). In particular, the shareable code may have a code parameter that defines an expiration or time-to-live for the sharable code. In such a situation, the code usage instructions 320 may condition the code redemption and any rewards for the code requestor based on the code being used prior to the expiration of the code (e.g., as defined in the code parameter of the code) (step 716). In other words, the code may not be redeemed or may not result in a reward for the code requestor if the code is attempted to be redeemed after expiration.

Figure 8:
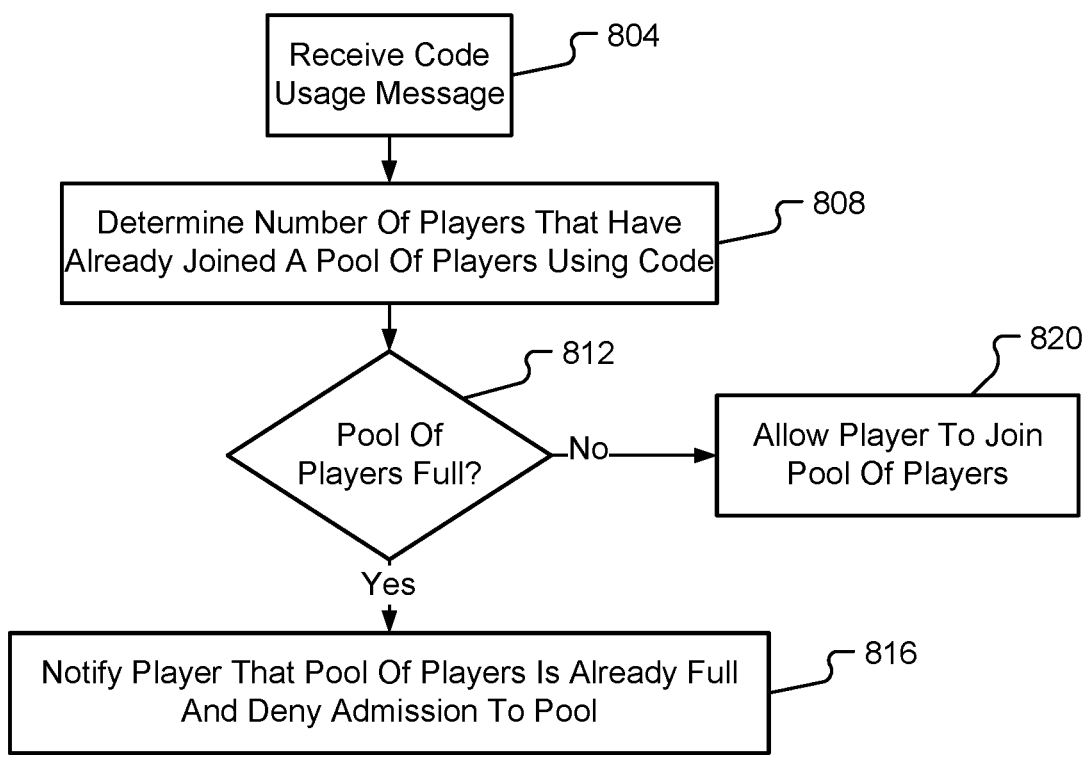
FIG. 8 is a flow diagram illustrating a method of constructing a pool of players with a shareable code in accordance with embodiments of the present disclosure.

With reference now to FIG. 8, a method of constructing a pool of players 412 with a shareable code will be described in accordance with embodiments of the present disclosure. The method begins when a code usage message is received (step 804). This step may be similar or identical to step 604 and/or step 704. The method continues by determining a number of players 112 that have already joined a player pool 412 by redeeming the shareable code identified in the code usage message (step 808). The determination made in step 808 may be made by the code usage instructions 320 referencing the shareable code field 140 or group status field 148 in the database 120.

The code usage instructions 320 may then determine whether or not the pool of players 412 is already full (step 812). In some embodiments, the shareable code may have a code parameter that defines a maximum size of the pool of players 412 (e.g., a maximum number of players 112 that can join the pool of players 412). In some embodiments, the shareable code may have a timer or particular event associated therewith that defines when the pool of players 412 will be closed (e.g., upon a game starting, upon receiving a command from the code requestor that the pool of players 412 is sufficiently sized, etc.). If the pool of players 412 is not yet full or is still subject to having additional players 112 added thereto, then the method may continue with the code usage instructions 320 allowing the newest redeeming player 112 to join the pool of players 412 (step 820). This step may involve invoking the method described in connection with FIG. 6.

If the pool of players 412 is already full, then the player 112 that attempted to redeem the code may be notified that the pool of players 412 is already full and the player 112 may be denied admission to the pool of players 412 (step 816). I some embodiments, it may also be possible to setup an automated notification that can be transmitted to the player 112 when another player 112 leaves the pool of players 412, thereby creating capacity for another player 112 to be added to the pool of players 412.

Figure 9:
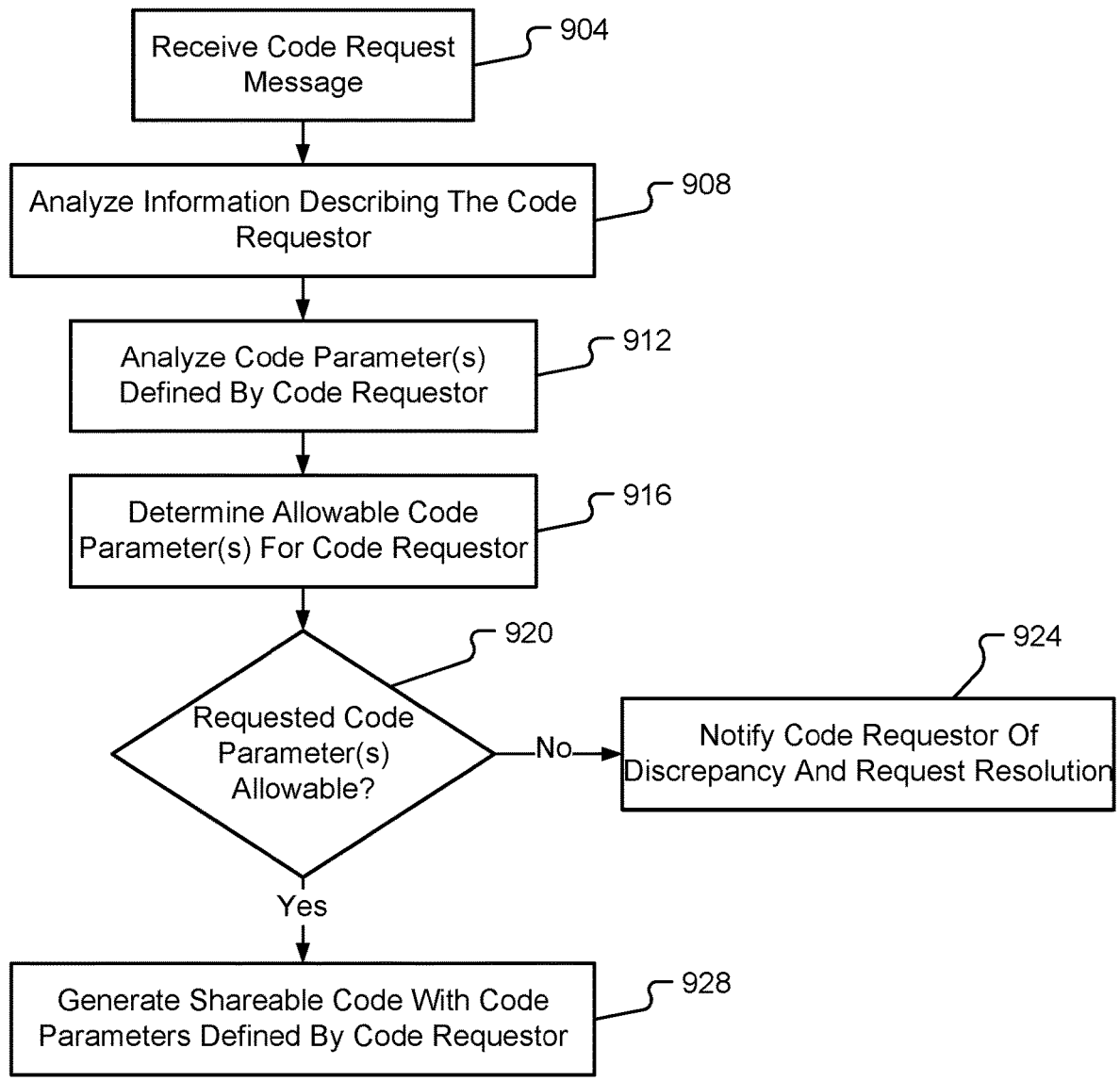
FIG. 9 is a flow diagram illustrating a method of defining code parameters for a shareable code in accordance with embodiments of the present disclosure.

Referring now to FIG. 9, a method of defining code parameters for a shareable code will be described in accordance with embodiments of the present disclosure. The method begins when a code request message is received at the game management system 116 (step 904). This particular step may be similar or identical to step 504. Upon receiving the code request message, the code generation and distribution instructions 316 may be invoked to analyze information describing the code requestor (step 908) and code parameter(s) being requested for the code (step 912). In some embodiments, the options for code parameter(s) may be limited when the code requestor is initially generating a request for the shareable code, in which case the method of FIG. 9 may be controlled at the computational device 200 of the code requestor. In some embodiments, the options for code parameter(s) may be presented to the code requestor at the computational device 200 without knowledge of the code requestor's permissions for generating a code with particular restrictions on code parameters.

The method may continue with the code generation and distribution instructions 316 determining allowable code parameter(s) for the code requestor (step 916). The determination made in this step may be made with reference to player information contained in the player information field 136 and/or a player identification contained in the player identification field 144. Specifically, a player 112 may have code parameter(s) that are limited, restricted, bounded, or otherwise defined based on a membership level of the player 112, based on a particular identity of the player 112, based on based on a device being used by the player 112, or combinations thereof.

The method may continue with the code generation and distribution instructions 316 determining if the requested code parameter(s) are allowable for the code requestor (step 920). If any of the requested code parameter(s) are not allowable, then the method may continue with the code generation and distribution instructions 316 notifying the code requestor of the discrepancy (step 924). The code generation and distribution instructions 316 may also attempt to help the code requestor resolve the discrepancy, for example, by providing the code requestor with alternative code parameter(s) that are allowable.

If the requested code parameters are determined to be allowable, then the method may continue with the code generation and distribution instructions 316 generating a shareable code with the code parameters defined by the code requestor (step 928). In some embodiments, the shareable code generated with the requested parameters may be used, distributed, and/or redeemed in accordance with the code parameters. One or more code parameters may also be used to automatically initiate or trigger game instructions 208 of a computational device 200 to start playing a game for the player 112 when the shareable code is redeemed. For example, the shareable code may be generated with code parameters that identify a particular game to be played with the code and instructions that automatically initiate the game on the computational device 200 when the shareable code is redeemed. The instructions that initiate the game may also include instructions that pair the computational device 200 of the player redeeming the code with a computational device 200 being used by the code requestor. As a more specific, but non-limiting example, the redemption of the code may cause the second player's 408 mobile device 124 to automatically initiate a game in addition to automatically pairing with the computational device 200 of the code generator (e.g., the first player 404). This automatic pairing may help to enforce a code parameter that requires the second player 408 to be within a predetermined proximity of the first player 404 to redeem the code.

In some embodiments, the game played by players 112 in the pool of players 412 may be hosted on one computational device 200 belonging to one player 112 in the pool of players 412. In some embodiments, each computational device 400 of each player 112 in the pool of players 412 may execute game instructions 208 to host the game. Any computational device 200 that is hosting or running the game for the pool of players 412 may use an output of a RNG that is executed at the computational device 200. As a non-limiting example, the computational device 200 being used by the code requestor may host the game and the RNG of that computational device 200 may be used to drive game outcomes for all games being played by all players 112 in the pool of players 412. When two or more computational devices 200 are wirelessly paired with one another (e.g., WiFi pairing, Bluetooth pairing, NFC pairing, etc.), the user interface of one computational device 200 may display information describing information about all other players in the pool of players 412. Each computational device 200 may also display which computational device(s) 200 are hosting the game being played by the pool of players 412 (e.g., by graphically displaying all computational devices 200 or identifiers of computational devices 200 and highlighting the computational device(s) 200 that is hosting the game).

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A system, comprising:
    a processor; and
    a computer memory device coupled with the processor and comprising instructions stored thereon that, when executed by the processor, enable the processor to:
        receive a code request message from a computational device, wherein the code request message comprises information describing a code requestor and a code parameter defined by the code requestor;
        analyze the information describing the code requestor to determine that the code requestor is permitted to receive a shareable code;
        determine that the requestor is permitted to receive the shareable code with the code parameter defined by the code requestor;
        generate, in response to determining that the code requestor is permitted to receive the shareable code with the code parameter defined by the code requestor, the shareable code;
        store an electronic record indicating that the shareable code has been generated, wherein the electronic record comprises an identifier of the shareable code and an identifier of the code requestor; and
        transmit a code delivery message to the computational device, wherein the code delivery message comprises the shareable code.

2. The system of claim 1, wherein the computer memory device further comprises instructions that, when executed by the processor, enable the processor to:
    receive a code usage message from a second computational device, wherein the code usage message comprises the identifier of the shareable code;
    reference the electronic record to determine that the shareable code has been redeemed by a person other than the code requestor; and
    update the electronic record to increment a number of sharing events associated with the shareable code.

3. The system of claim 2, wherein the computer memory device further comprises instructions that, when executed by the processor, enable the processor to:
    determine the number of sharing events associated with the shareable code exceeds a predetermined sharing threshold;
    in response to determining that the number of sharing events associated with the shareable code exceeds the predetermined sharing threshold, determine a reward for the code requestor;
    generate a rewards message that includes an identification of the reward; and
    transmit the rewards message to the computational device.

4. The system of claim 3, wherein the code parameter comprises an expiration associated with the shareable code and wherein the computer memory device further comprises instructions that, when executed by the processor, enable the processor to:
    determine a time at which the code usage message is received;

compare the time at which the code usage message is received with the expiration associated with the shareable code; and condition the reward for the code requestor on the code usage message being received prior to the expiration associated with the shareable code.

5. The system of claim 3, wherein the code parameter comprises player distribution criteria and wherein the computer memory device further comprises instructions that, when executed by the processor, enable the processor to:

determine whether or not the person other than the code requestor satisfies the player distribution criteria; and condition the reward for the code requestor on the person other than the code requestor satisfying the player distribution criteria.

6. The system of claim 5, wherein the player distribution criteria comprises an identifier of a particular game to be played by the person other than the code requestor as well as a type of computational device to be used for playing the particular game.

7. The system of claim 6, wherein the reward for the code requestor comprises at least one of a free play, a free spin, and a credit to use for playing the particular game.

8. The system of claim 6, wherein the type of computational device comprises an Electronic Gaming Machine (EGM) and wherein the code parameter further defines a location in which the EGM is required to be located.

9. The system of claim 1, wherein the shareable code is used by the code requestor to generate a pool of players for a game defined by the code parameter, wherein the code parameter further defines that each player to join the pool of players comprises a mobile device that is within a predetermined distance of the computational device, and wherein the code parameter further defines an amount of time that a player has to join the pool of players before the game is initiated.

10. The system of claim 9, wherein the shareable code expires after a predetermined number of players have joined the pool of players.

11. The system of claim 1, wherein determining that the requestor is permitted to receive the shareable code with the code parameter defined by the code requestor comprises analyzing a membership level associated with the code requestor and determining that the code parameter is allowable for persons comprising the membership level.

12. A computational device, comprising:
a networking interface;
a processor coupled with the networking interface; and
a computer memory device coupled with the processor and comprising instructions stored thereon that are executable by the processor, wherein the instructions comprise instructions that:

receive a shareable code, wherein the shareable code comprises a code parameter that defines a game to be played;

generate a code usage message, wherein the code usage message comprises an identifier of the shareable code;

transmit, via the networking interface, the code usage message to an authentication server;

receive, via the networking interface in response to transmitting the code usage message, a game initiation message, wherein the game initiation message comprises an identifier of the game and instructions that initiate the game; and automatically initiate the game based on receiving the game initiation message comprising the identifier of the game and the instructions that initiate the game.

13. The computational device of claim 12, further comprising:

a user interface that provides a user of the computational device with an ability to interact with the game, wherein the shareable code is used by a code requestor to generate a pool of players for the game, wherein the instructions that initiate the game comprise instructions that pair the computational device with a computational device being used by the code requestor.

14. The computational device of claim 13, wherein the game uses an output of a random number generator that is executed at the computational device being used by the code requestor, wherein the computational device being used by the code requestor comprises an Electronic Gaming Machine (EGM), wherein the networking interface wirelessly pairs with a networking interface of the EGM, and wherein the user interface displays information describing other players in the pool of players.

15. The computational device of claim 12, wherein the game is also executed at an Electronic Gaming Machine (EGM) other than the computational device and wherein a code requestor associated with the EGM is provided with an additional game award in response to the processor automatically initiating the game.

16. The computational device of claim 12, wherein receiving the shareable code comprises obtaining an image of the shareable code.

17. The computational device of claim 12, wherein receiving the shareable code comprises receiving an electronic message that contains the shareable code.

18. A method, comprising:
receiving, at a processor, a code request message from a computational device, wherein the code request message comprises information describing a code requestor and a code parameter defined by the code requestor;

analyzing, at the processor, the information describing the code requestor to determine that the code requestor is permitted to receive a shareable code;

determining, at the processor, that the requestor is permitted to receive the shareable code with the code parameter defined by the code requestor;

generating, at the processor and in response to determining that the code requestor is permitted to receive the shareable code with the code parameter defined by the code requestor, the shareable code;

storing, in a computer memory device, an electronic record indicating that the shareable code has been generated, wherein the electronic record comprises an identifier of the shareable code and an identifier of the code requestor; and transmitting a code delivery message to the computational device, wherein the code delivery message comprises the shareable code.

19. The method of claim 18, wherein the shareable code is used by the code requestor to generate a pool of players for a game defined by the code parameter, wherein the code parameter further defines that each player to join the pool of players comprises a mobile device that is within a predetermined distance of the computational device, and wherein the code parameter further defines an amount of time that a player has to join the pool of players before the game is initiated.

20. The method of claim 18, wherein the code parameter comprises player distribution criteria and wherein the method further comprises:
   determining, at the processor, whether or not a person other than the code requestor satisfies the player distribution criteria; and
   conditioning a reward for the code requestor on the person other than the code requestor satisfying the player distribution criteria.

* * * * *